US006239816B1

(12) United States Patent
Suzuki

(10) Patent No.: US 6,239,816 B1
(45) Date of Patent: May 29, 2001

(54) INK TRANSFER PRINTER AND THERMAL HEAD

(75) Inventor: Minoru Suzuki, Tochigi (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/164,597

(22) Filed: Oct. 1, 1998

(30) Foreign Application Priority Data

Oct. 2, 1997 (JP) .................................................. 9-285982

(51) Int. Cl.[7] .................................................. G01D 15/16

(52) U.S. Cl. ......................... 346/140.1; 347/171; 347/44; 347/56; 347/20; 347/54

(58) Field of Search ................................. 347/44, 54, 56, 347/20, 171; 346/140.1; B41J 2/135, 2/14, 2/145, 2/15, 2/55, 2/325, 2/04

(56) References Cited

U.S. PATENT DOCUMENTS

| | | | |
|---|---|---|---|
| 4,561,789 | 12/1985 | Saito | 347/102 |
| 4,731,621 | 3/1988 | Hayamizu et al. | 347/66 |
| 4,782,347 | 11/1988 | Kurematsu et al. | 346/140.1 |
| 5,481,280 | 1/1996 | Lam et al. | 346/140.1 |
| 5,638,104 | 6/1997 | Suzuki et al. . | |

FOREIGN PATENT DOCUMENTS

| | | |
|---|---|---|
| 2768963 | 4/1999 | (FR) . |
| 2142583 | 1/1985 | (GB) . |
| 62-267158 | 11/1987 | (JP) . |
| 90/12691 | 11/1990 | (WO) . |

OTHER PUBLICATIONS

English Language Abstract of JP 62–267158.

*Primary Examiner*—John Barlow
*Assistant Examiner*—Blaise Mouttet
(74) *Attorney, Agent, or Firm*—Greenblum & Bernstein, P.L.C.

(57) ABSTRACT

An ink transfer printer comprises a thermal head that has an ink reservoir provided on a top surface of a housing and a film provided on a bottom surface of the housing. A space is formed by the film and the bottom surface. An ink passage is formed in the housing to communicate the ink reservoir with the space. Porous glaze is provided on the bottom surface to face the ink passage. Heating elements are provided on the porous glaze. The ink kept in the ink reservoir is supplied to the space through the ink passage and the porous glaze. The film has perforated pores, which are substantially closed to block the ink when the heating elements are not heated. When the heating elements are heated, the film is deformed to eject the ink through the pores.

10 Claims, 4 Drawing Sheets

INK TRANSFER PRINTER AND THERMAL HEAD

BACKGROUND OF THE INVENTION

1. Field of the Invention

The present invention relates to an ink transfer printer, by which ink is transferred to a recording sheet so that an image is formed on the recording sheet, and a thermal head, which is provided in the ink transfer printer.

2. Description of the Related Art

As a printer which transfers ink onto a recording sheet, such as a plain paper, the following printers are known: an ink jet printer that jets ink as liquid particles onto the recording sheet from nozzles, a thermal transfer printer that heats an ink ribbon, becoming partially liquefied due to the heat, which uses a thermal head to thereby transfer the ink onto the recording sheet, and a wire dot printer that uses a steel wire for striking an ink ribbon against the recording sheet.

However, these known printers have the following associated problems: ink in the nozzle of the ink jet printer may clog, a running cost of the thermal transfer printer may increase due to the consumption of ink ribbons, and the processing speed of the wire dot printer is poor. Thus, a printer wherein ink clogging is prevented, the running cost is low, and the processing speed is fast, is desirable.

SUMMARY OF THE INVENTION

Therefore, an object of the present invention is to provide an ink transfer printer in which ink clogging is prevented, the running cost is low and the processing speed is fast.

According to the present invention, there is provided an ink transfer printer comprising a thermal head, an ink reservoir and a contact mechanism.

The thermal head is provided with a housing, in which an ink passage is formed, a film and a plurality of heating elements. The housing and the film define a closed space, in which the heating elements are located. The film has pores which perforate the film. The ink reservoir is provided on the housing to contain ink. The ink reservoir is disposed opposite to the heating elements. The ink reservoir communicates with the space through the ink passage. The contact mechanism enables the film to contact a recording sheet, whereby the ink in the ink reservoir is supplied to the space, heated by the heating elements, and transferred to the recording sheet through the pores.

Preferably, each of the pores has an inner diameter which is small enough to keep the ink in the space when the heating element is not in operation. In this construction, when the heating element heats, the film is deformed such that the pores expand to transfer the ink onto the recording sheet.

The ink transfer printer may further comprise porous glaze, on which the heating elements are placed. The porous glaze is provided on the housing to face the ink passage, so that the ink in the ink reservoir reaches the space through the ink passage and the porous glaze.

The thermal heat may be a thermal line head in which the plurality of heating elements are linearly aligned. In this case, the contact mechanism comprises a platen roller disposed in parallel to the thermal line head. The thermal line head may be disposed above the platen roller, with the ink reservoir being disposed above the thermal line head.

Further, according to the present invention, there is provided an ink transfer printer comprising a thermal head, an ink reservoir and a contact mechanism.

The thermal head is provided with a film, having pores passing therethrough, and a plurality of heating elements.

The thermal head and the film define a closed space, in which the heating elements are positioned. The ink reservoir, that holds ink, is provided on the thermal head at an opposite position to the heating elements. The ink reservoir communicates with the space through an ink passage formed in the thermal head. The contact mechanism enables the film to contact a recording sheet, whereby the ink in the ink reservoir is supplied to the space, heated by the heating elements, and transferred to the recording sheet through the film.

Furthermore, according to the present invention, there is provided a thermal head comprising a housing, a heating element, a film, an ink reservoir and an ink passage.

The thermal based in provided on a surface of the housing. The film is provided on the surface to cover the heating element in such a manner that the film defines a space. The film has pores perforated therein. The ink reservoir is provided on the housing to keep ink. The ink reservoir is disposed opposite to the heating elements. The ink passage communicates the ink reservoir with the space.

The thermal head may further comprise porous glaze, on which the heating element is placed, by which the ink, passing through the ink passage, reaches the space.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
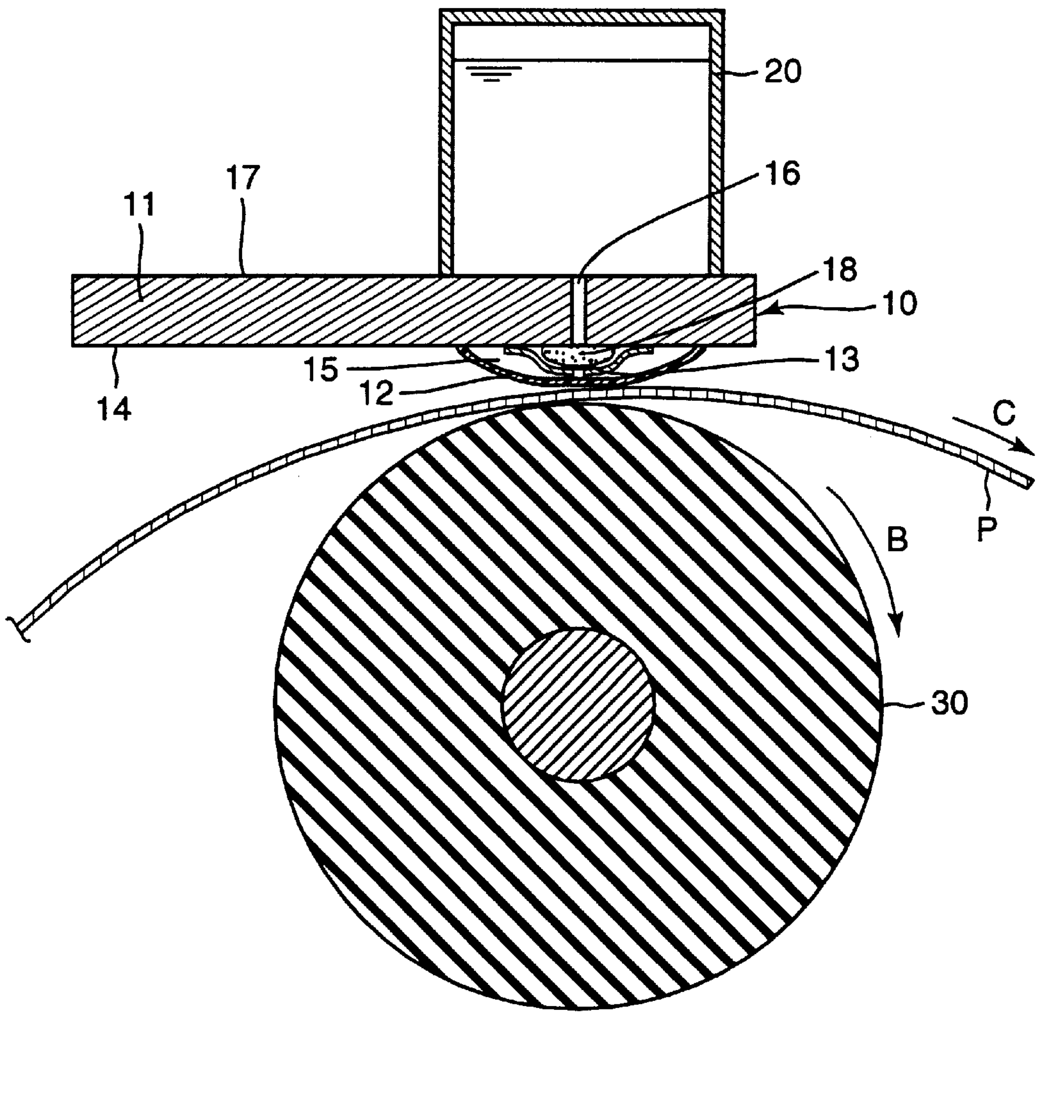
FIG. 1 is a side sectional view showing an ink transfer printer of an embodiment of the present invention.

FIG. 1 is a side sectional view showing an ink transfer printer of an embodiment of the present invention.

The ink transfer printer has a thermal head 10, an ink reservoir 20 and a platen roller 30. The thermal head 10 is provided with a housing 11, a film 12 and a plurality of heating elements 13. Note that, in all of the drawings, including FIG. 1, the film 12, the heating element 13 and other components provided close thereto are exaggerated to make it easy to understand the structures. In actuality, the thickness or the amount by which the film 12 projects from a bottom surface 14 of the housing 11 is approximately a few tens of microns.

The film 12 is attached to the bottom surface 14 to define a closed space 15 in which the heating elements 13 are located. The platen roller 30, which is made of rubber, is disposed under the thermal head 10, so that the platen roller 30 and the film 12 sandwich a recording sheet P. In other words, the platen roller 30 is operated as a contact mechanism to resiliently urge the film 12 into contact with the recording sheet P. The platen roller 30 is rotated about the axis thereof in a direction B, which feeds the recording sheet P in a direction C, due to a frictional force generated therebetween.

An ink passage 16 is formed in the housing 11. The ink passage 16 extends from a top surface 17 of the housing 11 to the bottom surface 14. The ink reservoir 20, containing ink, is disposed on the top surface 17. Namely, the ink reservoir 20 is disposed opposite to the heating element 13, and communicates with the space 15 through the ink passage 16. Porous glaze 18 is disposed on the bottom surface 14 to face a lower end mouth of the ink passage 16, so that ink, kept in the ink reservoir 20, flows through the ink passage 16 to the space 15 through the porous glaze 18. The heating elements 13 are placed on the porous glaze 18.

The porous glaze 18 is obtained by firing a glass material or a ceramic material, for example, a calcium phosphate derivative, such as hydroxyapatite, over an extended period at a low temperature, thereby enabling formation of a multitude of pores. A diameter of a pore of the porous glaze 18 preferably ranges from between 10 μm to 20 μm, since, if the diameter is less than 10 μm, the ink flow is too greatly restricted, and if the diameter is greater than 20 μm, the smoothness of the surface of the porous glaze 18 becomes unacceptably low.

Figure 2:
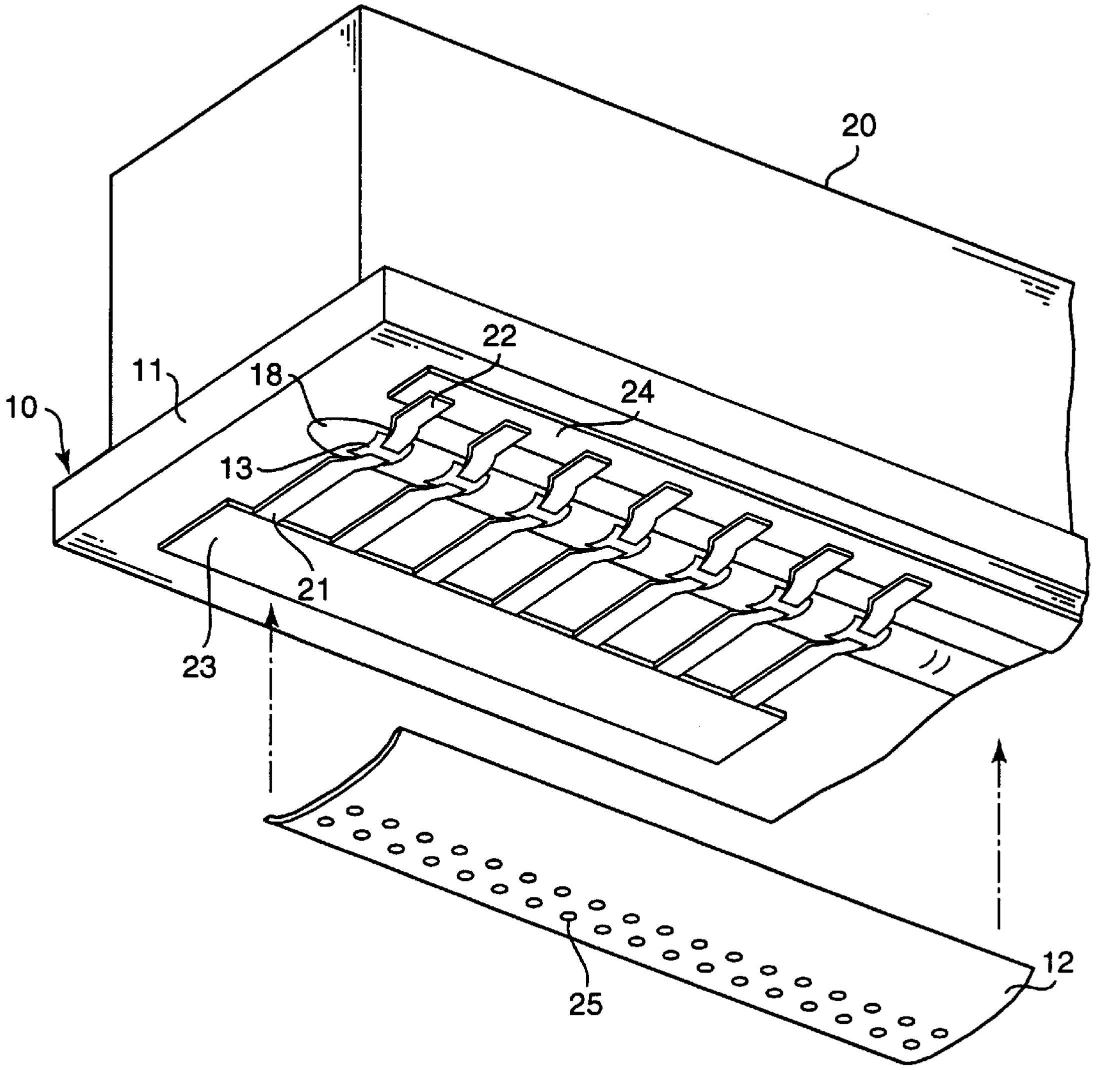
FIG. 2 is a perspective view showing a thermal line head.

FIG. 2 shows a perspective view of the thermal head 10, when viewing from the bottom thereof. The thermal head 10 is a thermal line head, in which the plurality of heating elements 13 are linearly aligned, along which the glaze 18 and the ink reservoir 20 are extended. The platen roller 30 (FIG. 1) is disposed in parallel to the thermal line head 10.

A pair of terminals 21 and 22 are connected to each of the heating elements 13. One terminal 21 is connected to a control circuit 23, and the other terminal 22 is connected to a common terminal 24, so that electric power is supplied to each of the heating elements 13.

The film 12 and the ink reservoir 20 extend in parallel to the housing 11. A large number of pores 25, passing through the film 12 and arranged along two rows aligned in the longitudinal direction of the housing 11, are perforated to allow the permeation of the ink. The pores 25 are formed in such a manner that some of the pores 25 correspond to one of the heating elements 13. The film 12 covers the heating elements 13, and the terminals 21 and 22. The space 15 (FIG. 1) defined by the housing 11 and the film 12 can retain the ink, and each of the pores 25 has an inner diameter which is small enough to restrict the ink to the space 15 when the heating elements 13 are not in operation.

A pore is formed by punching the film 12 with a needle while the film 12 is heated above the glass transition temperature at which the film 12 enters a rubber state. When the needle is removed from the film 12, the pore contracts due to the rubber elasticity of the film 12.

Figure 3:
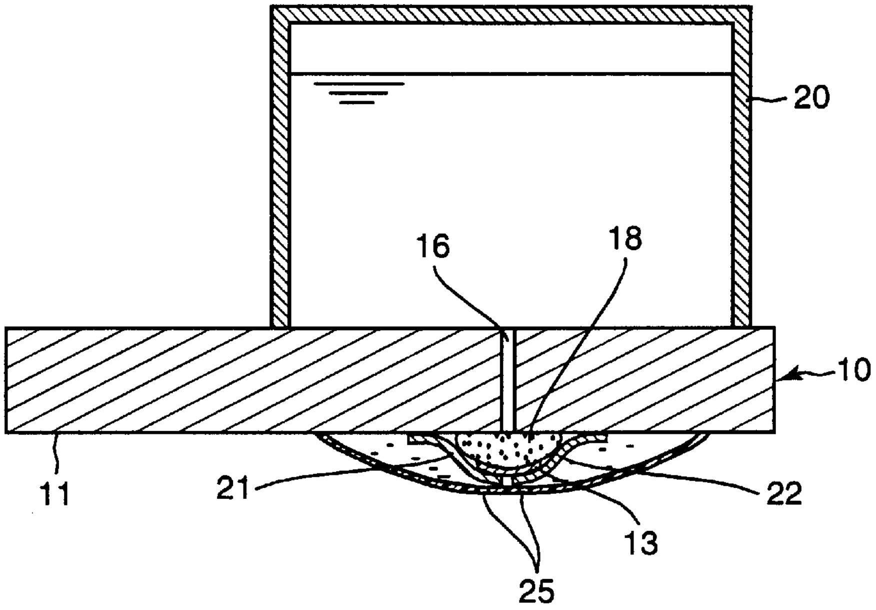
FIGS. 3 and 4 are sectional views showing a principle by which an image is formed on a recording sheet using the ink transfer printer of the embodiment.
Figure 4:
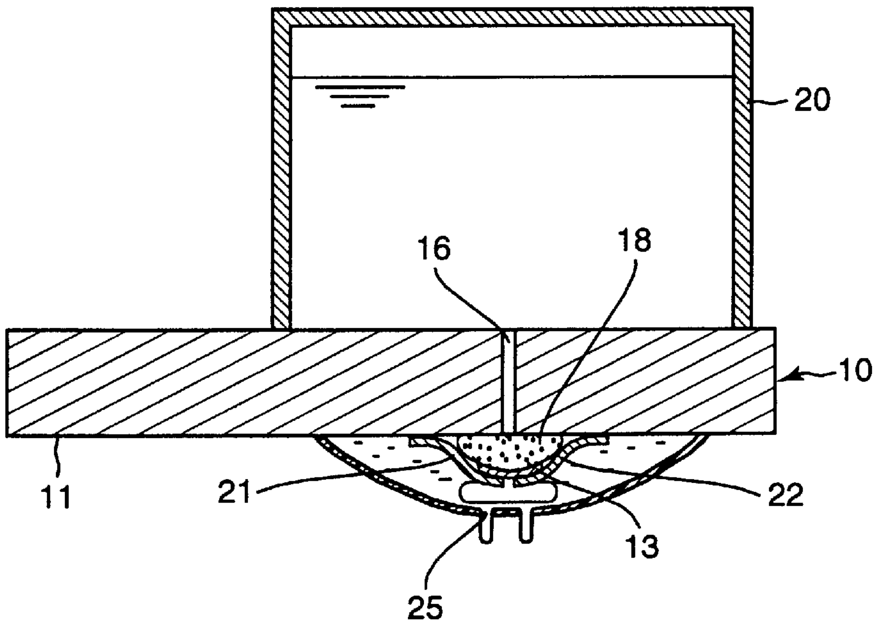

FIGS. 3 and 4 are sectional views showing a principle by which an image is formed on the recording sheet P using the ink transfer printer. Note that, in FIGS. 3 and 4, the plate roller 30 and the recording sheet P are omitted.

As described above, when the heating elements 13 do not heat, the inner diameter of each of the pores 25 is very small so that the ink is blocked and does not flow therethrough, as shown in FIG. 3. Conversely, when the heating elements 13 heat, the ink in the proximity of the heating elements 13 is locally heated, causing evaporation and expansion. Consequently, the pressure of the ink on the film 12 increases. At the same time, the film 12 is also heated, so that the elastic coefficient is lowered, and thus the film 12 becomes increasingly deformable. As a result, as shown in FIG. 4, the ink can forcibly expand the pores 25, thus passing into and through the pores 25 and transferring onto the recording sheet P (FIG. 1), which is in tight contact with the bottom surface of the film 12.

After the transfer of the ink, the heat of the heating elements 13 is stopped, so that the heated portions of the ink and the film 12 are cooled by the ink which has not been heated. Therefore, the inner diameter of each of the pores 25 is restored to the original size, effectively blocking the passage on the ink through the pores 25. Thus, in accordance with predetermined print information, the heat control of the thermal line head is performed and the platen roller 30 is rotated to feed the recording sheet P, so that an image is formed or printed on the recording sheet P.

The film 12 is very thin so that, when the heating elements 13 are heated, the film 12 is deformed allowing ejection of the ink through the pores 25. The surface of the porous glaze 18 is smooth enough so that the film 12 does not become roughened by being pressed onto the porous glaze 18 by the platen roller 30. Due to the smooth surface of the porous glaze 18, the durability of the film 12 is ensured, since abrasion of the film 12 is prevented. Note that, the heating elements 13 and the terminals 21 and 22 are also very thin, enabling the film 12 to contact the porous glaze 18.

The surface 14 of the housing 11 is rough, and thus, if the heater 12 and the terminals 21 and 22 were to be formed by vacuum evaporation or printing, for example, the surfaces of the heater 13 and the terminals 21 and 22 would also become rough, because of the texture of the surface 14 of the housing 11. Since the film 12 covers and is in contact with the heater 13 and the terminals 21 and 22, the film 12 would be easily damaged due to the roughness of the surfaces, and thus, the durability of the film 12 would be lowered. If the surfaces of the heater 13 and the terminals 21 and 22 were to be ground smooth, the thicknesses of the heater 13 and the terminals 21 and 22 would be changed, thereby altering the heat generation characteristics of heater 13. Therefore, grinding of the surfaces is not a viable option.

In this embodiment, by providing the porous glaze 18, with the heater 13 and the terminals 21 and 22 mounted thereon, on the surface 14 of the housing 11, the problem concerning the roughness of the housing 11 is negated, because the surfaces of the heater 13 and the terminals 21 and 22, which are in contact with the film 12, are now smooth. Thus, due to the smoothing effect of the porous glaze 18 on the inner surface of the film 12, the outer surface of the film 12 is also in smooth contact with the recording sheet P. Namely, the porous glaze 18 not only supplies the ink to the recording sheet P, but also serves to provide a non-abrasive contact between the recording sheet P and the film 12.

The diameter of each of the pores formed in the glaze 18 is between 10 and 20 μm, and the surface of the porous glaze 18 is smoother than that of the housing 11. Therefore, if the heater 13 and the terminals 21 and 22 are provided on the surface of the porous glaze 18, the surface of the heater 13 and terminals 21 and 22 become smooth, creating a non-abrasive environment whereby the smoothness of film 12 is not detrimentally affected. If necessary, the surface of the porous glaze 18 can be further ground to a required smoothness.

Figure 5:
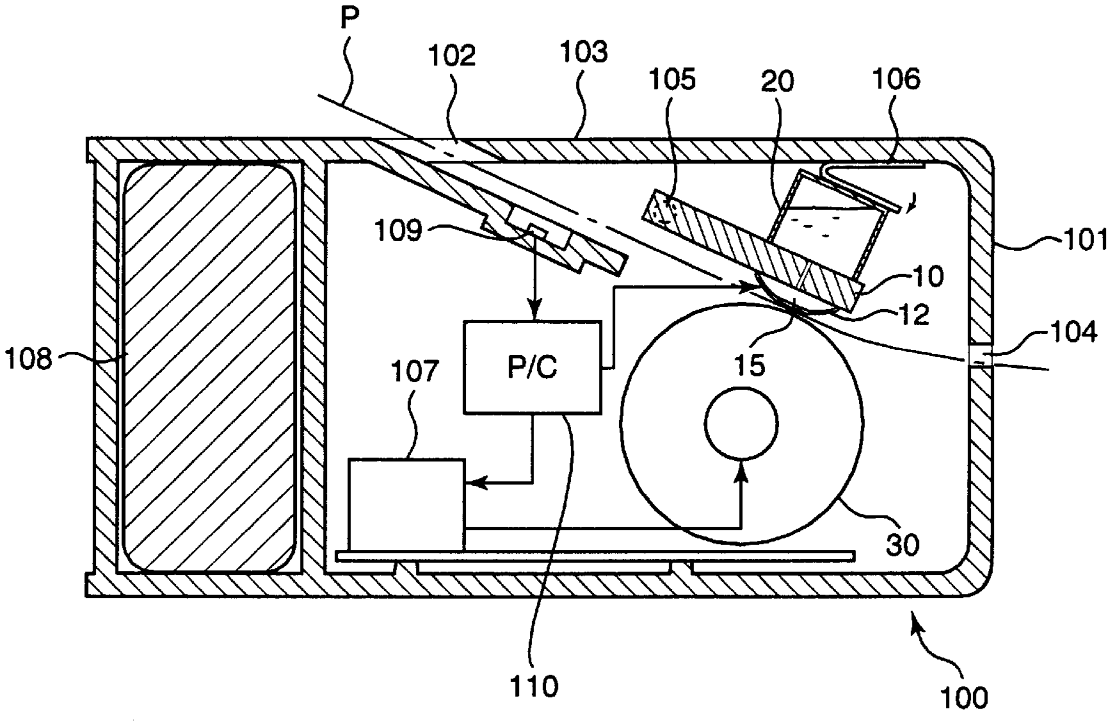
FIG. 5 is a sectional view showing a thermal line printer using the ink transfer printer of the embodiment.

FIG. 5 shows a general construction of a printer 100 to which the ink transfer printer, shown in FIG. 1, is applied. The printer 100 is a so-called thermal line printer. A housing 101, which is slender box-shaped, extends perpendicularly to the plane of the drawing. In the housing 101, the thermal line head 10, the film 12 and the platen roller 30, which also extend perpendicularly to the plane of the drawing, are disposed. Note that, in FIG. 5, the heating element 13 (FIG. 2) and the glaze 18 (FIG. 2) are omitted from the thermal line head 10, in order to simplify the illustration.

An inlet mouth 102, through which the recording sheet P is inserted, is formed in an upper wall 103, and an outlet mouth 104, through which the recording sheet P is ejected, is formed in a front wall (being the right side) of the housing 101 in FIG. 5. The recording sheet P inserted through the inlet mouth 102, is fed by the platen roller 30 to pass between the film 12 and the platen roller 30, and is guided to the outlet mouth 104.

The thermal line head 10 is rotatably supported by a support shaft 105 at one end portion thereof, and is urged downward by a bent flat spring 106 provided on a ceiling of the housing 101, so that the film 12 comes in tight contact with the recording sheet P under a predetermined pressure. The platen roller 30 is rotated at a predetermined speed by a drive motor 107. Due to the rotation of the platen roller 30, the recording sheet P moves along a path connecting the inlet mouth 102 and the outlet mouth 104. A power supply (battery) 108 is provided in the housing 101 to provide electric power to the drive motor 107.

A sheet sensor 109 is provided on a portion below the inlet mouth 102 to detect the insertion of the sheet P. A printer controller 110 is housed in the housing 101 and is connected to the control circuit 23 (FIG. 2), the sheet sensor 109 and the drive motor 107. Namely, when the sheet sensor 109 senses the recording sheet P, the drive motor 107 is driven by the printer controller 110, so that the recording sheet P is fed. Then, the heat control of the thermal line head 10 is performed in accordance with print information, and the platen roller 30 is rotated to feed the recording sheet P. Thus, a two dimensional image is formed or printed on the recording sheet P with the ink.

Note that, by providing a plurality of rows of the heating elements 13 corresponding to a plurality of colors, a color image can be formed on the recording sheet P.

As described above, according to the ink transfer printer of the embodiment, since the ink reservoir 20 is provided opposite to the heating elements 13 with respect to the housing 11, and the ink, kept in the ink reservoir 20, is supplied to the space 15 through the ink passage 16 passing through the housing 11, the construction of the ink passageway 16 is simple. Further, the ink passage 16 does not interfere with the platen roller 30, the recording sheet P and the other components disposed at the same side as the heating elements 13.

Furthermore, according to the ink transfer printer of the embodiment, due to the ink reservoir 20 being provided at a position opposite to the transfer unit, which comprises the film 12, the heating elements 13, the terminals 21 and 22, the platen roller 30 and the other related components, maintenance, such as ink supplementation to the ink reservoir 20 and the changing of the ink reservoir 20, is simplified.

Further, according to the embodiment, a range of volumes of the ink reservoir 20 can be accomodated, since the ink reservoir size is not restricted in any way by the other components.

Furthermore, since the surface of the film 12 is smooth, the film 12 is not subjected to high friction forces, and therefore, the durability of the film 12 is improved.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-285982 (filed on Oct. 2, 1997) which is expressly incorporated herein, by reference, in its entirety.

What is claimed is:

1. An ink transfer printer comprising:

a thermal head provided with a housing, in which an ink passage is formed, a film and a plurality of heating elements, said housing and said film defining a closed space in which said heating elements are located, said film having pores which perforate said film;

an ink reservoir provided on said housing that contains ink, said ink reservoir being disposed opposite to said heating elements, said ink reservoir communicating with said space through said ink passage;

porous glaze on which said heating elements are placed, said porous glaze being provided on said housing to face said ink passage, so that said ink in said ink reservoir reaches said space through said ink passage and said porous glaze; and a contact mechanism that contacts said film with a recording sheet, whereby said ink in said ink reservoir is supplied to said space, heated by said heating elements, and transferred to said recording sheet through said pores.

2. An ink transfer printer according to claim, 1 where each of said pores has an inner diameter which is small enough to restrict said ink to said space when said heating elements do not operate.

3. An ink transfer printer according to claim 2, wherein said film is deformed such that said pores expand to transfer said ink to said recording sheet, when said heating elements operate.

4. An ink transfer printer according to claim 1, where said porous glaze is obtained by firing one of a glass material and a ceramic material over an extended period at a low temperature, such that said pores are formed.

5. An ink transfer printer according to claim 1, wherein a diameter of each of said pores is from between 10 $\mu$m to 20 $\mu$m.

6. An ink transfer printer according to claim 1, wherein said thermal head is a thermal line head in which said plurality of heating elements are linearly aligned.

7. An ink transfer printer according to claim 6, wherein said contact mechanism comprises a platen roller disposed in parallel to said thermal line head.

8. An ink transfer printer according to claim 6, wherein said thermal line head is disposed above said platen roller, and said ink reservoir is disposed above said thermal line head.

9. An ink transfer printer comprising:

a thermal head provided with a film, having pores passing therethrough, and a plurality of heating elements, said thermal head and said film defining a closed space in which said heating elements are positioned;

an ink reservoir, that holds ink, provided on said thermal head at an opposite position to said heating elements, said ink reservoir communicating with said space through an ink passage formed in said thermal head;

porous glaze being provided between said ink reservoir and said heating elements, so that said ink in said ink reservoir is supplied to said closed space through said porous glaze; and a contact mechanism that contacts said film on a recording sheet, whereby said ink in said ink reservoir is supplied to said space, heated by said heating elements, and transferred to said recording sheet through said film.

10. A thermal head comprising:

a housing;

a heating element provided on a surface of said housing;

a film provided on said surface to cover said heating element is such a manner that said film defines a space, said film having pores perforated therein;

an ink reservoir provided on said housing to hold ink, said ink reservoir being disposed opposite to said heating element;

an ink passage that communicates said ink reservoir with said space; and porous glaze, on which said heating element is placed, by which said ink passing through said ink passage, reaches said space.

* * * * *